(12) United States Patent
Lee et al.

(10) Patent No.: US 12,471,798 B2
(45) Date of Patent: Nov. 18, 2025

(54) SACROILIITIS DISCRIMINATION METHOD USING SACROILIAC JOINT MR IMAGE

(71) Applicant: SAMSUNG LIFE PUBLIC WELFARE FOUNDATION, Seoul (KR)

(72) Inventors: Seulkee Lee, Seoul (KR); Hoon-Suk Cha, Seoul (KR); Uju Jeon, Seoul (KR); Myung Jin Chung, Seoul (KR)

(73) Assignee: SAMSUNG LIFE PUBLIC WELFARE FOUNDATION, Seoul (KR)

( * ) Notice: Subject to any disclaimer, the term of this patent is extended or adjusted under 35 U.S.C. 154(b) by 98 days.

(21) Appl. No.: 18/392,475

(22) Filed: Dec. 21, 2023

(65) Prior Publication Data
US 2024/0324891 A1    Oct. 3, 2024

(30) Foreign Application Priority Data
Mar. 28, 2023    (KR) .................. 10-2023-0040767

(51) Int. Cl.
*A61B 5/055* (2006.01)
*G06T 7/00* (2017.01)
*G16H 30/40* (2018.01)

(52) U.S. Cl.
CPC ............ *A61B 5/055* (2013.01); *G06T 7/0012* (2013.01); *G16H 30/40* (2018.01); *G06T 2207/10088* (2013.01); *G06T 2207/20081* (2013.01); *G06T 2207/20084* (2013.01); *G06T 2207/30008* (2013.01); *G06T 2207/30012* (2013.01)

(58) Field of Classification Search
CPC .............. A61B 5/055; G06T 7/0012; G06T 2207/10088; G06T 2207/20081; G06T 2207/20084; G16H 30/40
See application file for complete search history.

(56) References Cited

U.S. PATENT DOCUMENTS

2020/0129114 A1* 4/2020 Griffith .................. A61B 5/459

FOREIGN PATENT DOCUMENTS

KR    102384083 B1 * 4/2022 ............. A61B 5/055

OTHER PUBLICATIONS

Lee, K. H., Choi, S. T., Lee, G. Y., Ha, Y. J., & Choi, S. I. (2021). Method for diagnosing the bone marrow edema of sacroiliac joint in patients with axial spondyloarthritis using magnetic resonance image analysis based on deep learning. Diagnostics, 11(7), 1156. (Year: 2021).*

(Continued)

*Primary Examiner* — Keith M Raymond
*Assistant Examiner* — Johnathan Maynard
(74) *Attorney, Agent, or Firm* — Harness, Dickey & Pierce, P.L.C.

(57) ABSTRACT

Disclosed herein is a method for discriminating sacroiliitis by using sacroiliac joint MR images, implemented by one or more processors of a computing device, the method comprising the steps of: collecting MR images related to the sacroiliac joint and preprocessing the collected MR images to generate training data; training a bone marrow edema discrimination model by using the generated training data; and using the trained bone marrow edema discrimination model to determine the presence of sacroiliitis from MR images related to the patient's sacroiliac joint.

7 Claims, 10 Drawing Sheets

(56) References Cited

OTHER PUBLICATIONS

Amorim, P. H., Moraes, T. F., Silva, J., & Pedrini, H. (Jan. 2018). 3D Adaptive Histogram Equalization Method for Medical Volumes. In VISIGRAPP (4: VISAPP) (pp. 363-370). (Year: 2018).*

Üreten, K., Maraş, Y., Duran, S., & Gök, K. (2021). Deep learning methods in the diagnosis of sacroiliitis from plain pelvic radiographs. Modern Rheumatology, 33(1), 202-206. (Year: 2021).*

Bressem, K. K., Adams, L. C., Proft, F., Hermann, K. G. A., Diekhoff, T., Spiller, L., . . . & Poddubnyy, D. (2022). Deep learning detects changes indicative of axial spondyloarthritis at MRI of sacroiliac joints. Radiology, 305(3), 655-665. (Year: 2022).*

Salem, N., Malik, H., & Shams, A. (2019). Medical image enhancement based on histogram algorithms. Procedia Computer Science, 163, 300-311. (Year: 2019).*

Aouad, T., Lopez-Medina, C., Martin-Peltier, C., Bordner, A., Yang, S., Molto, A., . . . & Talbot, H. (Oct. 2022). Incrementally semi-supervised classification of arthritis inflammation on a clinical dataset. In 2022 IEEE International Conference on Image Processing (ICIP) (pp. 3351-3355). IEEE. (Year: 2022).*

Gou, S., Lu, Y., Tong, N., Huang, L., Liu, N., & Han, Q. (2021). Automatic segmentation and grading of ankylosing spondylitis on MR images via lightweight hybrid multi-scale convolutional neural network with reinforcement learning. Physics in Medicine & Biology, 66(20), 205002. (Year: 2021).*

Turk, S., Demirkaya, A., Turali, M. Y., Hepdurgun, C., Dar, S. U., Karabulut, A. K., . . . & Cukur, T. (2023). Jointnet: A deep model for predicting active sacroiliitis from sacroiliac joint radiography. arXiv preprint arXiv:2301.10769. (Year: 2023).*

Ribeiro, G., Pereira, T., Silva, F., Sousa, J., Carvalho, D. C., Dias, S. C., & Oliveira, H. P. (2023). Learning Models for Bone Marrow Edema Detection in Magnetic Resonance Imaging. Applied Sciences, 13(2), 1024. (Year: 2023).*

Hepburn, C., Jones, A., Bainbridge, A., Ciurtin, C., Iglesias, J. E., Zhang, H., . . . & Bray, T. J. (2021). Volume of hyperintense inflammation (VHI): a deep learning-enabled quantitative imaging biomarker of inflammation load in spondyloarthritis. arXiv preprint arXiv:2106.11343. (Year: 2021).*

Rzecki, K., Kucybala, I., Gut, D., Jarosz, A., Nabagło, T., Tabor, Z., & Wojciechowski, W. (2021). Fully automated algorithm for the detection of bone marrow oedema lesions in patients with axial spondyloarthritis—feasibility study. Biocybernetics and Biomedical Engineering, 41(2), 833-853. (Year: 2021).*

Han, Q., Lu, Y., Han, J., Luo, A., Huang, L., Ding, J., . . . & Zhu, P. (2022). Automatic quantification and grading of hip bone marrow oedema in ankylosing spondylitis based on deep learning. Modern Rheumatology, 32(5), 968-973. (Year: 2022).*

Bressem, K. K., Vahldiek, J. L., Adams, L., Niehues, S. M., Haibel, H., Rodriguez, V. R., . . . & Poddubnyy, D. (2021). Deep learning for detection of radiographic sacroiliitis: achieving expert-level performance. Arthritis Research & Therapy, 23, 1-10. (Year: 2021).*

Faleiros, M. C., Nogueira-Barbosa, M. H., Dalto, V. F., Ferreira, J. R., Tenório, A. P. M., Luppino-Assad, R., . . . & Azevedo-Marques, P. M. D. (2020). Machine learning techniques for computer-aided classification of active inflammatory sacroiliitis in magnetic resonance imaging. (Year: 2020).*

Lucknavalai, K. (2020). Real-Time Contrast Enhancement for 3D Medical Image Stacks. University of California, San Diego. (Year: 2020).*

MathWorks. (2022). MATLAB R2022b Documentation: Deep Learning Data Preprocessing. (Year: 2022).*

* cited by examiner (a)

(b)

(Input layer) (Hidden layer) (Output layer)

SACROILIITIS DISCRIMINATION METHOD USING SACROILIAC JOINT MR IMAGE

CROSS REFERENCE TO RELATED APPLICATION

This application claims priority to Korean Patent Application No. 10-2023-0040767, filed on Mar. 28, 2023. The entire disclosure of the application identified in this paragraph is incorporated herein by reference.

FIELD OF THE INVENTION

The present disclosure relates to a method for discriminating sacroiliitis in axial spondyloarthritis using sacroiliac joint magnetic resonance imaging (MRI) images.

BACKGROUND OF THE INVENTION

Conventionally, the radiological diagnosis of axial spondyloarthritis was performed using plain radiography. Recently, the focus has shifted towards diagnosing and starting treatment before structural anomalies occur, thereby increasing the reliance on MRI for diagnosis. In general clinical settings, the discrimination of sacroiliitis using sacroiliac joint MRI images is performed by humans and is subject to interpretation based on set criteria, but this can be ambiguous in certain cases.

Moreover, there are few rheumatologists and radiologists with sufficient experience in interpreting sacroiliitis, leading to reduced medical accessibility.

Therefore, there is a need for technology that allows for the automated determination of sacroiliitis from sacroiliac joint MRI images, even in primary care settings without rheumatology/radiology specialists.

The above information disclosed in this Background section is merely for enhancement of understanding of the background of the disclosure and therefore it may contain information that does not form the prior art that is already known to a person skilled in the art.

SUMMARY OF THE INVENTION

The present disclosure aims to propose a sacroiliac joint MR image-based sacroiliitis discrimination method that allows for the determination of sacroiliitis in axial spondyloarthritis without the need for a specialist, using artificial intelligence.

A method for discriminating sacroiliitis according to the present disclosure, which uses sacroiliac joint MR images with the aid of one or more processors of a computing device, includes the steps of: collecting MR images related to the sacroiliac joint and preprocessing the collected MR images to generate training data; training a bone marrow edema discrimination model by using the generated training data; and using the trained bone marrow edema discrimination model to determine the presence of sacroiliitis from MR images related to the patient's sacroiliac joint.

The step of generating training data may include a step of normalizing the collected MR images to minimize intensity variations in the MR images due to brightness variability between images of different samples or within slices of the same sample.

The step of normalizing MR images may be carried out by stacking the MR images into a 3D volume, dividing the volume into grids, redistributing the brightness values in each grid area, and then storing them back as 2D slices to uniformize the brightness values between images.

The step of generating training data may include a step of extracting regions of interest of the sacroiliac joint by using a trained bounding box creation model.

The step of extracting regions of interest may involve automatically extracting the regions of interest through Faster R-CNN, and creating input images of the same size, based on the extracted regions.

The step of extracting regions of interest may include extracting feature maps from the normalized MR images through the bounding box creation model, calculating the regions of interest of the sacroiliac joint, adjusting the size of the calculated regions of interest to be the same, and performing object classification to extract the final regions of interest (ROI) for each object.

The step of generating training data may include rotating the MR image by a predetermined value and then extracting the region of interest, with the size of the extracted region of interest increased by a set value up, down, left, and right.

The step of generating training data may include stacking at least three consecutive slices, including the front and back slices based on a certain slice, then generating training data based on the stacked slices to consider the front and rear slices rather than learning with only one slice when determining bone marrow edema.

For both-end slices, the training data may be generated by stacking only one slice in front or behind the end slice.

The computing device of the present disclosure includes a processor with one or more cores, and a memory. The processor collects MR images related to the sacroiliac joint, preprocesses the collected MR images to generate training data, trains a bone marrow edema discrimination model using the generated training data, and uses the trained model to determine the presence of sacroiliitis from MR images related to the patient's sacroiliac joint.

A computer program according to the present disclosure, stored in a computer-readable storage medium, includes instructions to cause a computer to perform the following actions: collecting MR images related to the sacroiliac joint, preprocessing the collected MR images to generate training data, training a bone marrow edema discrimination model using the generated training data, and using the trained model to determine the presence of sacroiliitis from MR images related to the patient's sacroiliac joint.

The present disclosure provides an environment under which, even without a rheumatologist or a radiologist sufficiently experienced in interpreting sacroiliitis, it is possible to determine the presence of sacroiliitis, thereby increasing medical accessibility and aiding in the early diagnosis of the disease.

Moreover, the present disclosure includes stacking MR images to create a 3D volume, dividing the image of the 3D volume into grids, redistributing the brightness values in each grid area, and storing the redistributed brightness values back as 2D slices to uniformize the brightness values between MR images. This approach addresses the issue of varying brightness values between slices for different patients or within the same patient, thereby improving the learning efficiency of the bone marrow edema discrimination model.

Furthermore, in the present disclosure, areas of interest are automatically extracted through Faster R-CNN to effectively focus and localize the small sacroiliac joint area, thereby enhancing the learning efficiency of the bone marrow edema discrimination model.

Additionally, in the present disclosure, the MR images are augmented data sixfold for images labeled positive, using methods like blurring, contrast adjustment, noise addition, rotation, and sharpening, followed by extracting the area of interest, with the size of the area of interest increased by a set value up, down, left, and right, whereby changes in joint position due to image rotation can be prevented.

Moreover, in the present disclosure, at least three consecutive slices including the front and back slices based on a certain slice are stacked and training data is generated based on these stacked slices, to compensate for low-brightness slices and utilize the front and back slices together rather than learning or discriminating with only one slice, thereby enhancing the learning and discrimination efficiency of the bone marrow edema model.

Finally, the present disclosure normalizes the MR images to uniformize the brightness values, extracts the region of interest of the sacroiliac joint using a trained bounding box creation model, and generates training data, whereby the characteristics of the sacroiliac joint that require specific brightness and areas for effective learning are reflected to improve learning efficiency and prevent a decline in learning performance due to anatomical shape, size differences, or limitations in image quality.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
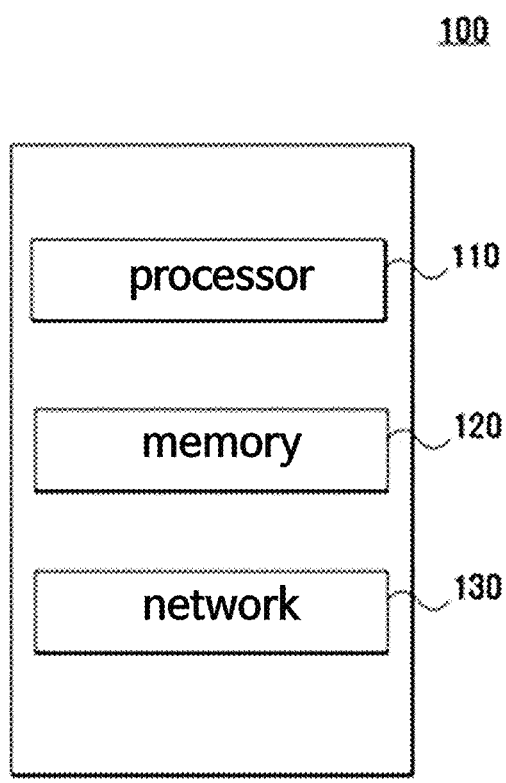
FIG. 1 is a block diagram of a computing device for determining the presence of sacroiliitis using sacroiliac joint MR images according to an embodiment of the present disclosure.

Hereinafter, exemplary embodiments of the present disclosure will be described more fully hereinafter with reference to the accompanying drawings, so as to be easily carried out by those skilled in the art. However, the present disclosure can be realized in various different forms, and is not limited to the exemplary embodiments described herein. Accordingly, in order to apparently describe the present disclosure, a portion that does not relate to the description is omitted. Like reference numerals designate like elements throughout the specification.

Throughout the description, if a prescribed part "includes" a certain component, it means not to exclude a different component but to further include the different component unless there is a specific opponent comment. Moreover, such terminologies written in the present specification as "unit", "module" and the like indicate a unit processing at least one or more functions or operations and these functions or operations can be implemented by hardware, software or a combination thereof.

Various embodiments will now be described with reference to drawings. In the present specification, various descriptions are presented to provide appreciation of the present disclosure. However, it is apparent that the embodiments can be executed without the specific description.

As used herein, the terms "component", "module", "system", "protocol", and the like are intended to refer to a computer-related entity, hardware, a combination of hardware and software, software, or software in execution. For example, a component may be, but is not limited to being, a process running on a processor, an object, a thread of execution, a program, and/or a computer. By way of illustration, both an application running on a server and the server can be a component. One or more components may reside within a process and/or thread of execution and a component may be localized on one computer and/or distributed between two or more computers. Further, the components may be executed by various computer-readable media having various data structures, which are stored therein. The components may perform communication with another system through local and/or remote processing according to a signal (e.g., data from one component that interacts with other components and/or data from other systems through a network such as the Internet through a signal in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

The word "comprises" and/or "comprising" means that the corresponding feature and/or component is present, but it should be appreciated that presence or addition of one or more other features, components, and/or a group thereof is not excluded. Further, when not separately specified or it is not clear in terms of the context that a singular form is indicated, it should be construed that the singular form generally means "one or more" in this specification and the claims.

The expression "at least one of A or B" should be interpreted to mean "a case including only A", "a case including only B", and "a case in which A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative component, blocks, configurations, means, logic, modules, circuits, and operations have been generally described above in the functional aspects thereof. Whether the functionality is implemented by hardware or software depends on a specific application or design restraints given to the general system. Those skilled in the art may implement the functionality described by various methods for each of the specific applications, but it shall not be construed that the determinations of the implementation deviate from the range of the contents of the present disclosure.

The description of the presented embodiments is provided so that those skilled in the art of the present disclosure use or implement the present disclosure. Various modifications to the embodiments will be apparent to those skilled in the art. Generic principles defined herein may be applied to other embodiments without departing from the scope of the present disclosure. Therefore, the present disclosure is not limited to the embodiments presented herein. The present disclosure should be analyzed within the widest range which is coherent with the principles and new features presented herein.

With reference to FIGS. 1 to 5, a detailed description will be given of a method for determining sacroiliitis using sacroiliac joint MR images according to an embodiment of the disclosure:

FIG. 1 represents a block diagram of a computing device for determining the presence of sacroiliitis using sacroiliac joint MR images according to an embodiment of the present disclosure.

The configuration of the computing device 100 depicted in FIG. 1 is merely a simplified illustration. In one embodiment of the present disclosure, the computing device 100 may include other components necessary for performing its computing environment, and only some of the disclosed components may constitute the computing device 100.

The computing device 100 in one embodiment of the present disclosure may include a processor 110, memory 120, and a network 130.

The processor 110 may consist of one or more cores and may include processors for data analysis and deep learning, such as a central processing unit (CPU), a general-purpose graphics processing unit (GPGPU), a tensor processing unit (TPU), or etc. The processor 110 may read computer programs stored in memory 120 to perform data processing for machine learning according to one embodiment of the present disclosure. The processor 110 may carry out computations for the training of neural networks, including processing input data for learning in deep learning (DL), feature extraction from input data, error calculation, and updating neural network weights using backpropagation. At least one of the CPU, GPGPU, and TPU in the processor 110 may handle the training of network functions. For instance, the CPU and GPGPU may work together to handle the training of network functions and data classification using the network functions. Additionally, processors from multiple computing devices can be used together to handle the training and data classification using network functions in one embodiment of the present disclosure. The computer program executed in the computing device according to an embodiment of the present disclosure may be a CPU, GPGPU, or TPU executable program.

According to one embodiment of the present disclosure, the processor 110 is capable of collecting MR images related to the sacroiliac joint, preprocessing the collected MR images to generate training data, training a bone marrow edema discrimination model using the generated training data, and using the trained bone marrow edema discrimination model to determine the presence of sacroiliitis from MR images related to the patient's sacroiliac joint.

The processor 110 may normalize the collected MR images to minimize intensity variations in the MR images due to the variability of brightness among images of different samples or within slices of the same sample.

For example, the processor 110 may stack the MR images to create a 3D volume, then apply Adaptive Histogram Equalization (AHE) to the image of the volume divided into grids to redistribute the brightness values in each grid area, and store the redistributed brightness values back as 2D slices to uniformize the brightness values between images.

The processor 110 may extract the region of interest of the sacroiliac joint using a trained bounding box creation model.

By way of example, the processor 110 may automatically extract the region of interest (ROI) through Faster R-CNN, efficiently localizing the sacroiliac joint, and apply image editing (e.g., crop & resize) to the extracted region of interest to create input images of the same size.

In the present disclosure, regions of interest are automatically extracted through Faster R-CNN to effectively focus on and localize the small sacroiliac joint area within MR images. Here, focusing and localization involve identifying or specifying the small sacroiliac joint area in MR images as a region of interest.

The processor 110 may extract feature maps from normalized MR images using a bounding box creation model (e.g., ResNet-50) and then calculate the ROI of the sacroiliac joint area. The processor 110 can apply ROI pooling (e.g., max pooling) to adjust the size of the calculated ROI to be the same, and then perform final object classification to extract the final ROI for each object class.

Due to the significantly higher number of slices without bone marrow edema compared to those with bone marrow edema, the processor 110 can augment the data of images labeled positive by six times. This augmentation of the regions of interest in the images is achieved through techniques such as blurring, adjusting contrast, adding noise, rotating, and sharpening.

The processor 110 may randomly rotate the entire MR image within a specified range (e.g., −20° to +20°) and subsequently extract the ROI in the same manner as before. Taking into account the positional changes of the joint due to image rotation, the processor 110 can expand the size of the ROI by a fixed number of pixels (e.g., 10 pixels) up, down, left, and right.

The processor 110 can stack at least three consecutive slices including the front and back slices based on one slice so as to consider the front and back slices instead of learning from only one slice when determining bone marrow edema and then can generate learning data based on stacked slices.

For the opposite end slices, the processor 110 can stack just one additional slice, either in front or behind, making a total of two stacked slices for generating training data.

In an embodiment of the present disclosure, the memory 120 can store any type of information generated or determined by the processor 110, as well as any information received by the network 130.

The memory 120 may include at least one type of storage medium including a flash memory, a hard disk, a multimedia card micro type, a card-type memory (e.g., SD or XD memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the computing device 100 may be operated in relation to a web storage device that performs the storage function of the memory 120 in the Internet. The description of the memory is illustrated, but does not limit the present disclosure.

The network 130 according to the embodiment of the present disclosure may use a predetermined form of a publicly known wire/wireless communication system.

The network 130 may receive sacroiliac joint MR images from related devices or systems.

The network 130 may transceive information processed by the processor 110, the user interface, and the like through communication with other terminals. For example, the network 130 may provide the user interface generated by the processor 110 to a client (for example, a user terminal). Further, the network 130 may receive the external input of the user applied to the client and transfer the received external input to the processor 110. In this case, the processor 110 may process the operations of output, correction, change, addition, and the like of the information provided through the user interface based on the external input of the user received from the network 130.

The computing device 100 according to the embodiment of the present disclosure is a computing system for transceiving information with the client through communication and may include a server. In this regard, the client may be a predetermined form of terminal accessible to the server.

In an additional embodiment, the computing device 100 may also include a predetermined form of terminal which receives data resources generated in a predetermined server and performs additional information processing.

Figure 2:
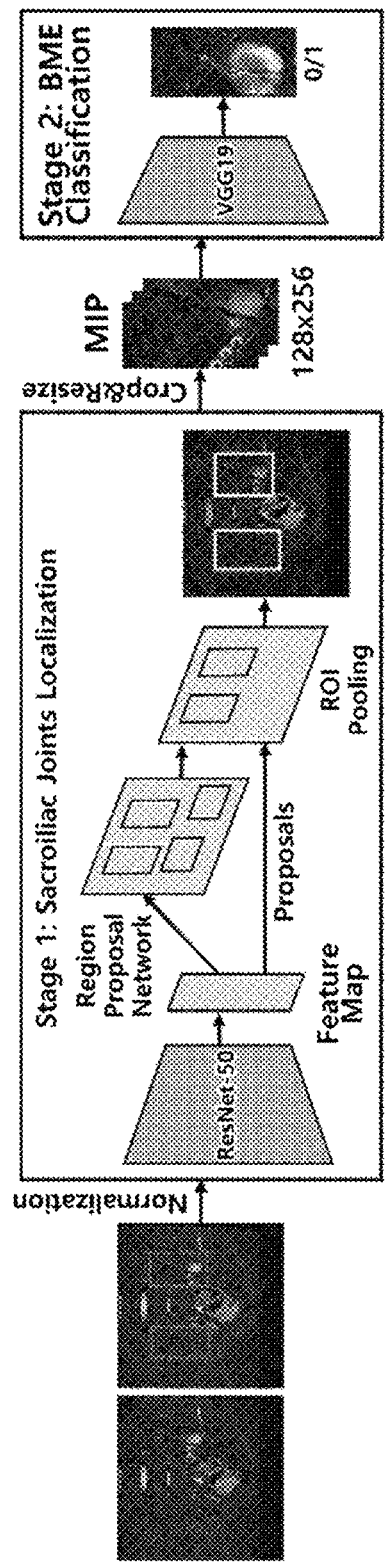
FIG. 2 is a schematic diagram illustrating a pipeline for extracting regions of interest from sacroiliac joint MR images to generate training data and training a bone marrow edema discrimination model using the generated training data according to an embodiment of the present disclosure.
Figure 3:
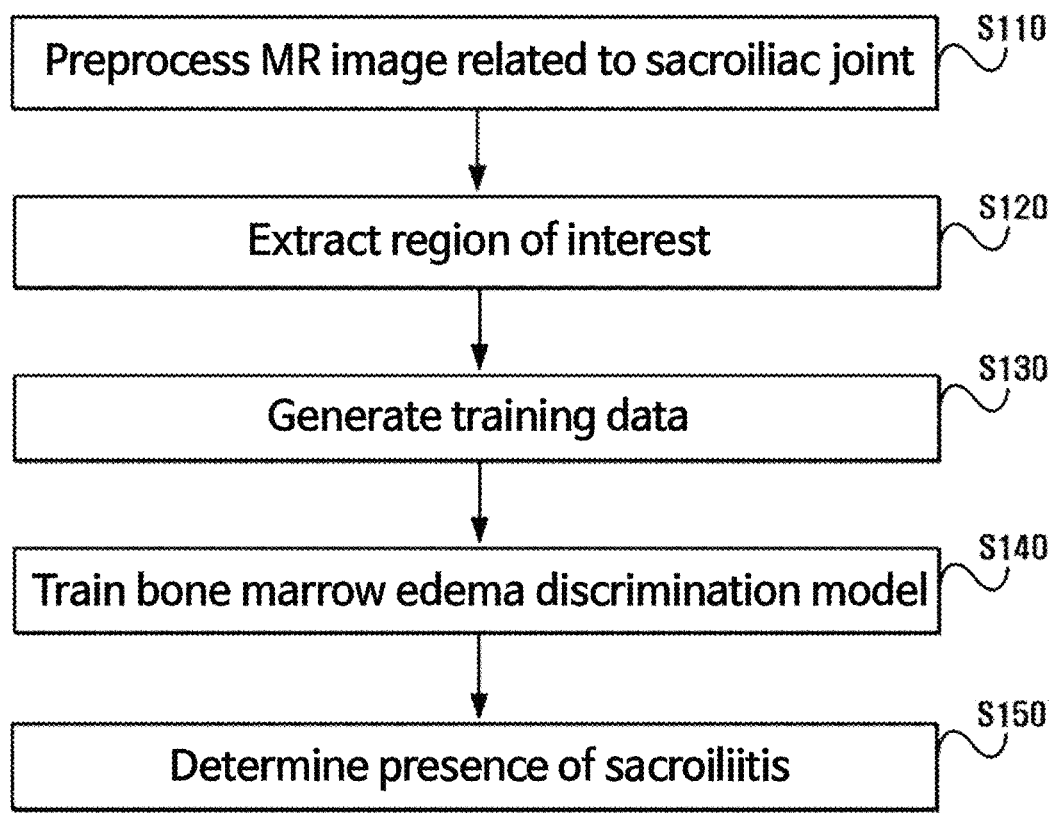
FIG. 3 is a flowchart briefly illustrating the process of determining the presence of sacroiliitis using sacroiliac joint MR images, according to an embodiment of the present disclosure.

FIG. 2 illustrates a diagram briefly showing a pipeline according to an embodiment of the present disclosure for extracting regions of interest from sacroiliac joint MR images to generate training data and training a bone marrow edema discrimination model using the generated training data. FIG. 3 is a flowchart that briefly outlines the process of determining the presence of sacroiliitis using sacroiliac joint MR images, according to an embodiment of the present disclosure.

Referring to FIGS. 2 and 3, the computing device 100 may collect MR images related to the sacroiliac joint, preprocess the collected MR images, and extract the regions of interest of the sacroiliac joint using a pre-trained bounding box creation model (S110 to S130).

The computing device 100 may normalize the collected MR images to minimize intensity variations due to the variability of brightness among images of different samples or within slices of the same sample.

Furthermore, the computing device 100 may automatically extract regions of interest (ROIs) using Faster R-CNN to efficiently localize the sacroiliac joint, and apply image editing (e.g., crop & resize) to the extracted ROIs to create input images of the same size.

For example, the computing device 100 may extract feature maps from normalized MR images using a bounding box creation model (e.g., ResNet-50), and then calculate the ROI of the sacroiliac joint area.

Additionally, the computing device 100 may apply ROI pooling (e.g., max pooling) to adjust the sizes of the calculated ROI to be the same, and then perform final object classification to classify or detect objects, extracting the final ROI for each object class.

For bone marrow edema discrimination, the computing device 100 can generate training data not just from a single slice but by stacking at least three consecutive slices, including the front and back slices based on a certain slice. For both end slices, only one slice from the front or back is used to stack a total of two slices for generating training data.

Also, the computing device 100 may use the generated training data to train a bone marrow edema discrimination model (S140).

The computing device 100 may use the trained bone marrow edema discrimination model to determine the presence of sacroiliitis from MR images related to the patient's sacroiliac joint (S150).

Figure 4:
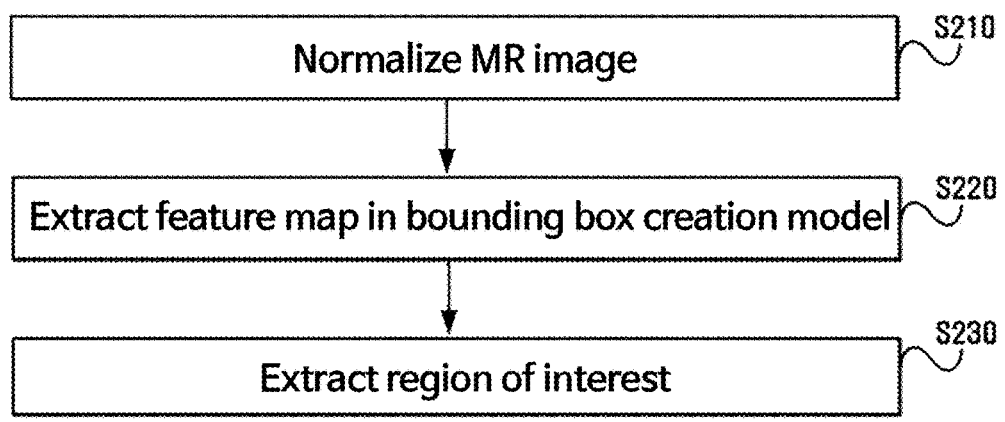
FIG. 4 is a flowchart depicting the process of using a bounding box creation model to extract the region of interest of the sacroiliac joint and then generating input images of the same size, according to an embodiment of the present disclosure.

FIG. 4 is a flowchart illustrating the process of using a bounding box creation model to extract the region of interest of the sacroiliac joint and then creating input images of the same size according to an embodiment of the present disclosure.

Referring to FIG. 4, the computing device 100 may collect MR images related to the sacroiliac joint and normalize the collected MR images to minimize intensity variation among images of different patient samples or slices within the same sample (S210).

Here, the MR images may include STIR images of the sacroiliac joint area cut in the coronal plane.

Figure 5:
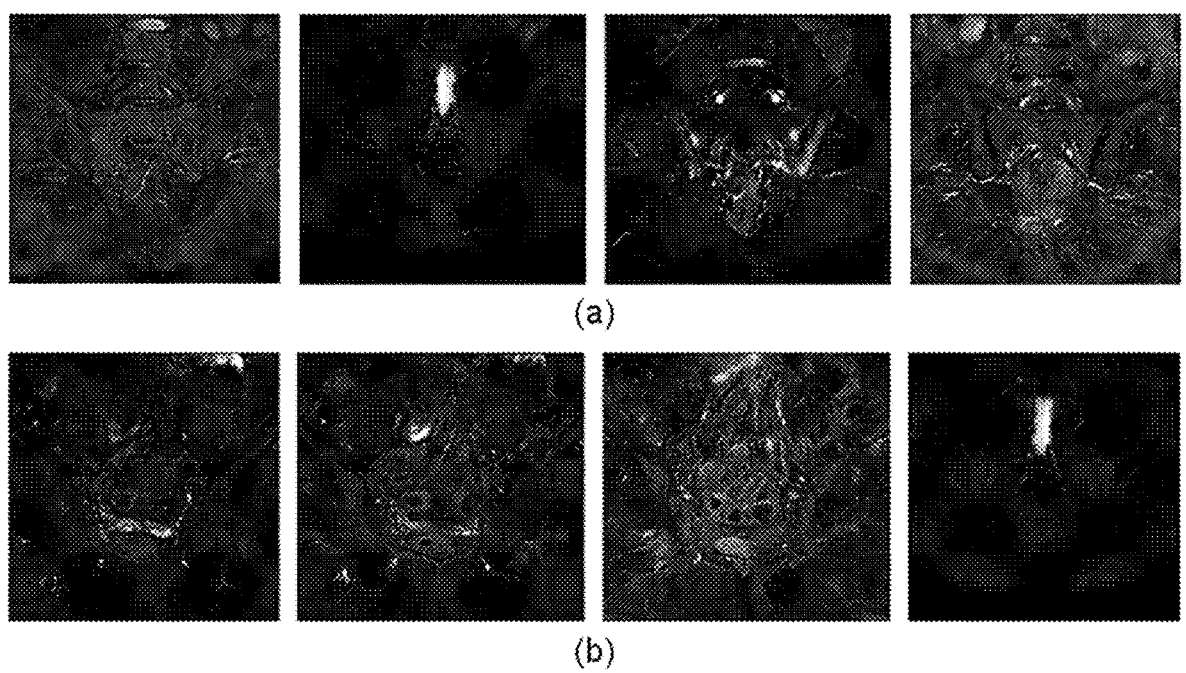
FIG. 5 shows the variability of brightness values in MR images.

FIG. 5 shows the variability of brightness values in MR images.

Referring to FIG. 5, the necessity of normalizing MR images is shown to minimize intensity variations in MR images due to the diversity in brightness among different sample MR images (a) and within slices of the same sample (b).

Figure 6:
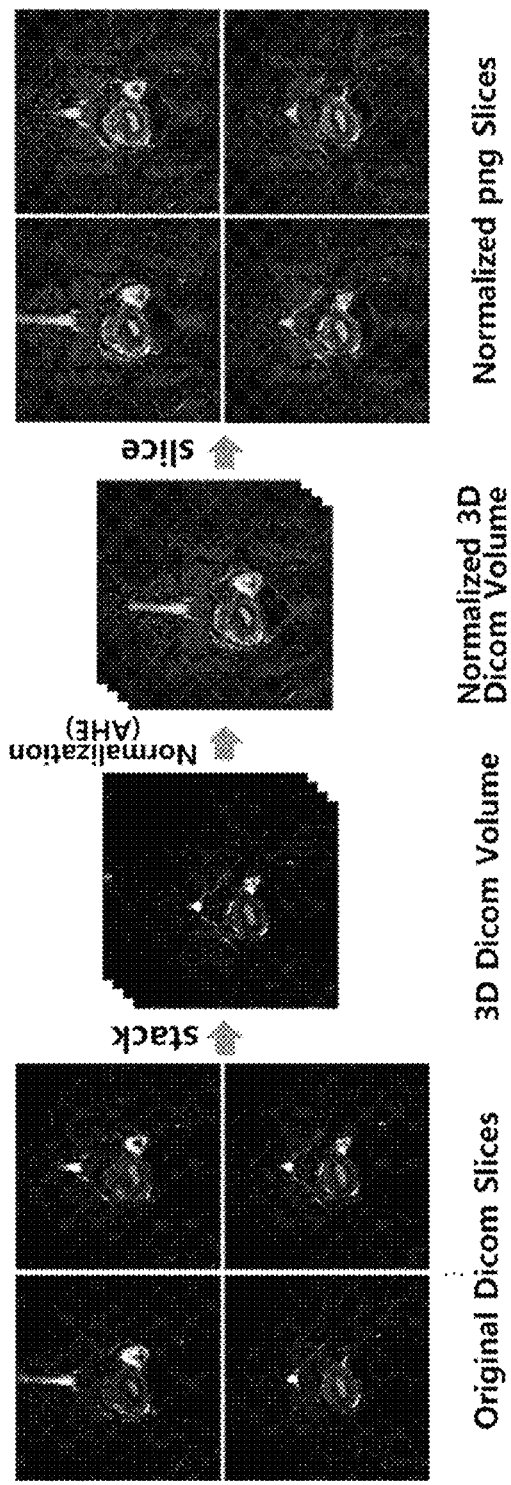
FIG. 6 shows images illustrative of an example of stacking MR images to create a 3D volume and then dividing the image of the volume into grids to redistribute brightness values in each grid area, according to an embodiment of the present disclosure.

FIG. 6 shows an example of stacking MR images to create a 3D volume and then redistributing brightness values in each grid area of the 3D volume's image, according to an embodiment of the present disclosure.

With reference to FIG. 6, the computing device 100 may stack MR images to form a 3D volume, divide the image of the 3D volume into grids, apply Adaptive Histogram Equalization (AHE) to redistribute brightness values in each grid area, and then store the redistributed 3D images back as 2D slices to uniformize brightness values between images.

Previously, redistributing pixel values over the entire range after computing the histogram for the entire image led to problems such as the bright parts becoming too bright, reducing overall contrast.

However, in the present disclosure, the MR image is divided into multiple grid areas, histograms are calculated for each grid, and brightness values are redistributed, thus enhancing local and overall contrast in MR images.

Furthermore, the computing device 100 may extract feature maps using a bounding box creation model as the sacroiliac joint occupies a small part of the overall MR image, to effectively locate this area (S220).

For example, the computing device 100 may extract feature maps from normalized MR images using a bounding box creation model (e.g., ResNet-50).

Additionally, the computing device 100 may extract the region of interest of the sacroiliac joint using the bounding box creation model (S230).

For example, the computing device 100 may automatically extract the ROI using Faster R-CNN, efficiently localize the sacroiliac joint, and apply image editing (e.g., crop & resize) to the extracted ROI to create input images of the same size.

Moreover, the computing device 100 may calculate the ROI of the sacroiliac joint from the extracted feature map, apply ROI pooling (e.g., max pooling) to the calculated ROI to standardize its size, and then perform final object classification to extract the final ROI for each object class.

Figure 7:
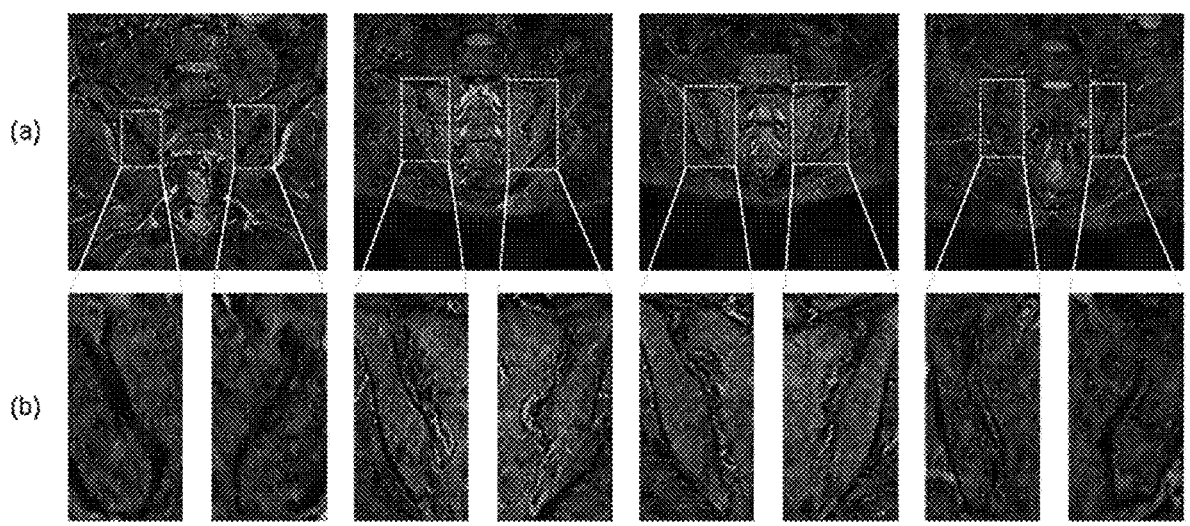
FIG. 7 shows images illustrative of an example of extracting the region of interest of the sacroiliac joint using a bounding box creation model, according to an embodiment of the present disclosure.

FIG. 7 shows images illustrative of an example of extracting the region of interest of the sacroiliac joint using a bounding box creation model according to an embodiment of the present disclosure.

Referring to FIG. 7, the computing device 100 may generate input images to be used for region of interest (ROI) extraction and bone marrow edema (BME) classification. FIG. 7a shows the result of the ROI extraction, and FIG. 7b illustrates an example where image editing (e.g., crop & resize) is applied to the extracted ROI to create input images of the same size.

Since the number of slices without bone marrow edema significantly exceeds those with bone marrow edema, the computing device 100 may augment data sixfold for images labeled positive, using methods like blurring, contrast adjustment, noise addition, rotation, and sharpening.

For instance, the computing device 100 may apply these methods to image-edited (crop & resize) ROIs, specifically only to positive image slices, so as to address the class imbalance between positive and negative images.

Figure 8:
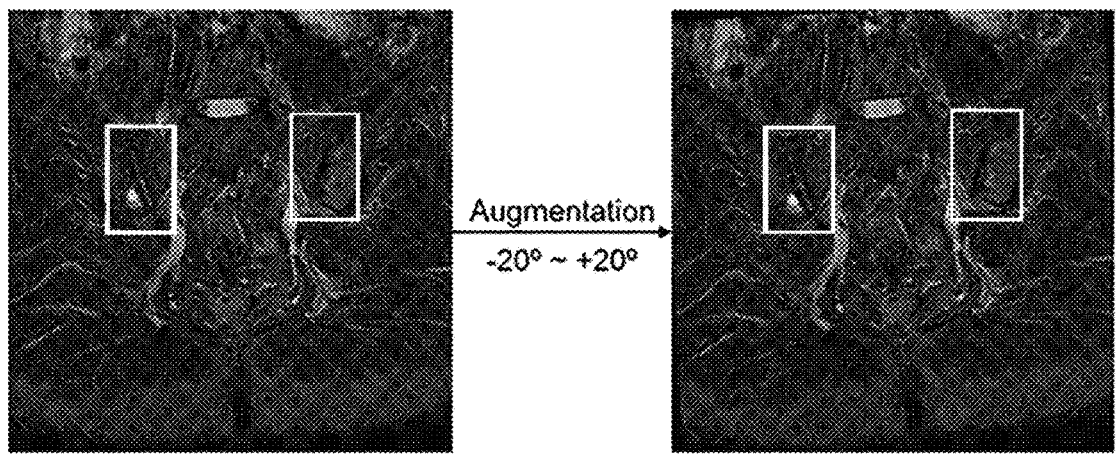
FIG. 8 shows images illustrative of an example of rotating MR images to extract regions of interest, according to an embodiment of the present disclosure.

FIG. 8 shows images illustrative of an example of extracting the region of interest by rotating the MR image according to an embodiment of the present disclosure.

Referring to FIG. 8, when applying data augmentation, the entire MR image may be randomly rotated within a certain range (e.g., −20° to +20°) before extracting the ROI in the same manner as before. During rotation, considering the change in the joint's position, the size of the ROI can be expanded by a set number of pixels (e.g., 10 pixels) in up, down, left, and right directions.

Figure 9:
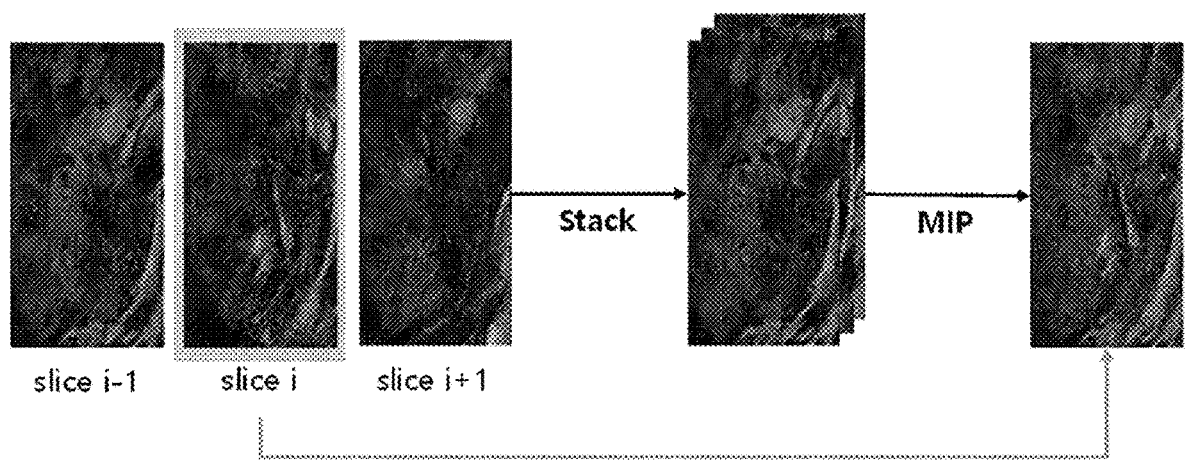
FIG. 9 shows images illustrative of an example of stacking at least three consecutive slices including the front and back slices based on a certain slice and generating training data based on these stacked slices, according to an embodiment of the present disclosure.

FIG. 9 shows images illustrative of an example of generating training data based on stacking at least three consecutive slices, including front and back slices, based on a certain slice, according to an embodiment of the present disclosure.

Referring to FIG. 9, the computing device 100 can stack at least three consecutive slices (slice i, slice i+1, and slice i−1) around a particular slice (slice i) for bone marrow edema discrimination and then apply Maximal Intensity Projection (MIP) to the stacked slices, so that consideration is not taken of only one slice, but of three slices (slice i, slice i+1, and slice i−1). For both end slices, the computing device (100) can stack only one additional slice either in front or back and apply MIP to a total of two slices.

Figure 10:
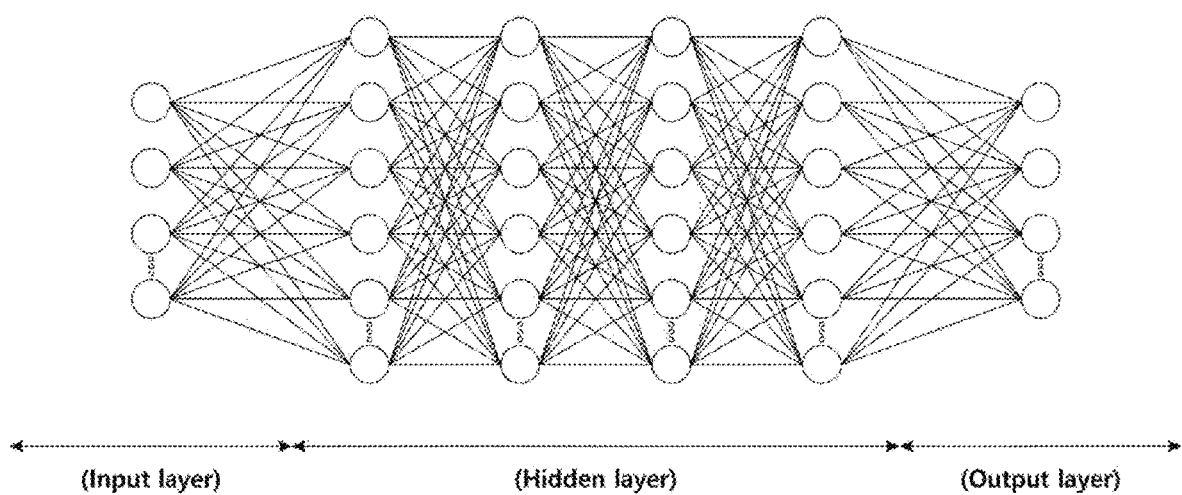
FIG. 10 is a conceptual diagram of a network function according to an embodiment of the present disclosure.

FIG. 10 is a conceptual diagram according to an embodiment of the present disclosure, representing the network function.

The bone marrow edema discrimination model (machine learning or neural network model) according to one embodiment of the present disclosure can include a neural network for determining the presence of sacroiliitis from MR images related to the patient's sacroiliac joint.

Throughout the present specification, the meanings of a nerve network, the network function, and the neural network may be interchangeably used. The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weights between the links are different, the two neural networks may be recognized to be different from each other.

The neural network may consist of a set of one or more nodes. A subset of the nodes forming the neural network may form a layer. Some of the nodes configuring the neural network may form one layer based on distances from an initial input node. For example, a set of nodes having a distance of n from an initial input node may form n layers. The distance from the initial input node may be defined by the minimum number of links, which need to be passed from the initial input node to a corresponding node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the embodiment of the present disclosure, the number of nodes of the input layer may be the same as the number of nodes of the output layer, and the neural network may be in the form that the number of nodes decreases and then increases again from the input layer to the hidden layer. Further, in the neural network according to another embodiment of the present disclosure, the number of nodes of the input layer may be smaller than the number of nodes of the output layer, and the neural network may be in the form that the number of nodes decreases from the input layer to the hidden layer. Further, in the neural network according to another embodiment of the present disclosure, the number of nodes of the input layer may be larger than the number of nodes of the output layer, and the neural network may be in the form that the number of nodes increases from the input layer to the hidden layer. The neural network according to another embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a restricted Boltzmann machine (RBM), a deep belief network (DBN), a Q network, a U network, Siamese network, and the like. The foregoing description of the deep neural network is merely illustrative, and the present disclosure is not limited thereto.

In the embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, half or more of the number of nodes of the input layer and the like).

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labeled with a correct answer (that is, labeled training data) is used, in each training data, and in the case of the unsupervised learning, a correct answer may not be labeled to each training data. That is, for example, the training data in the supervised learning for data classification may be data, in which category is labeled to each of the training data. The labeled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the back propagation. A change amount of the updated connection weight of each node may be determined according to a learning rate. The calculation of the neural network for the input data and the back propagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the learning process, a method using a batch normalization layer, and the like may be applied.

Figure 11:
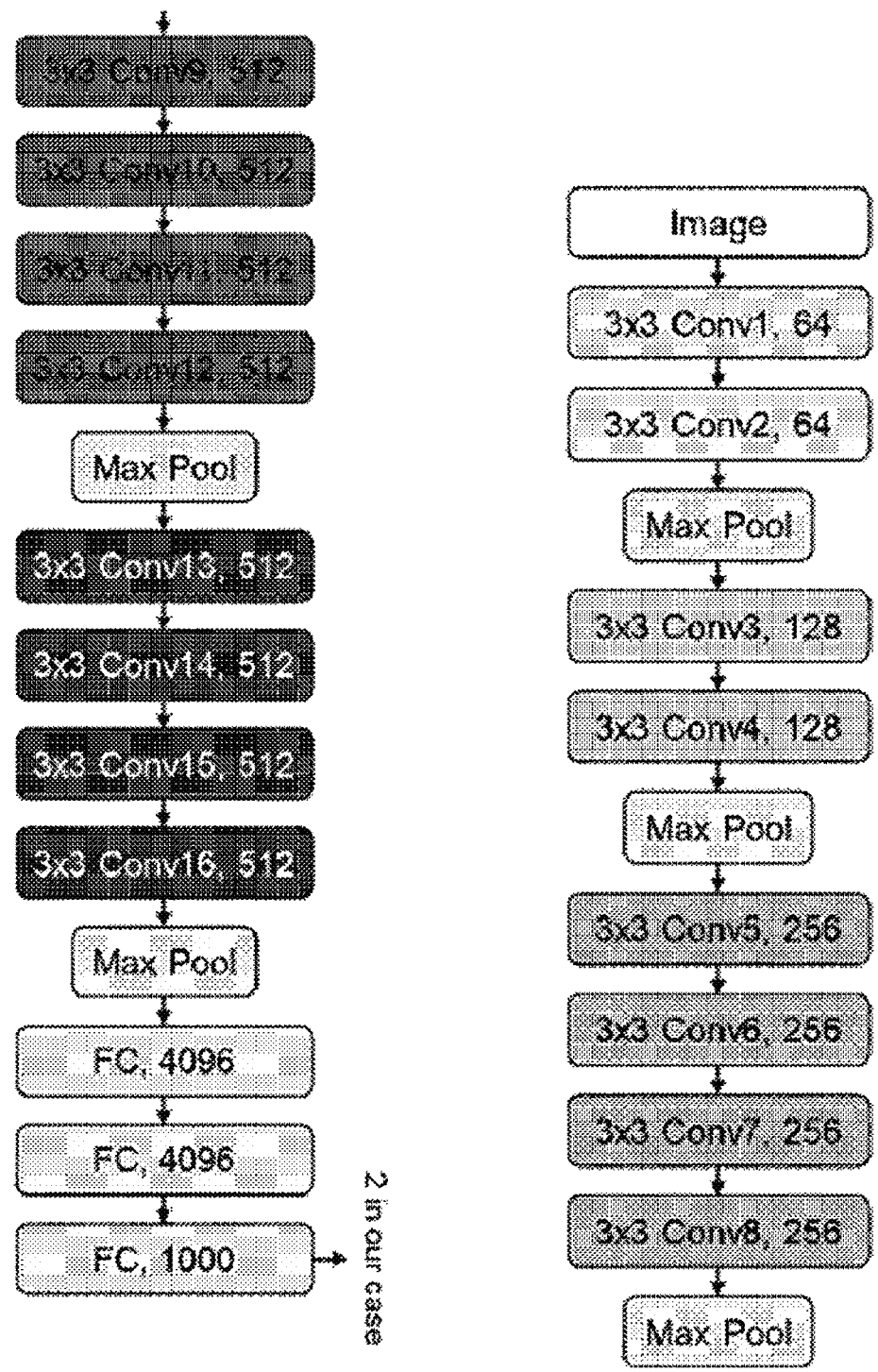
FIG. 11 is a diagram illustrating the network structure according to an embodiment of the present disclosure.

FIG. 11 is a diagram illustrating the network structure according to an embodiment of the present disclosure.

Referring to FIG. 11, the present disclosure may use the VGG-19 network structure to learn the classification of bone marrow edema (BME classification) in the sacroiliac joint area. While the original fully connected layer in a typical VGG-19 network can output 1000 classes, the bone marrow edema classification in the present disclosure, being a binary classification for positive (1) and negative (0), allows for modifying the output of the last fully connected layer to two classes.

Subsequently, the present disclosure may effectively discern the presence of sacroiliitis by inputting into the bone marrow edema discrimination model, classified through the VGG19 method, the bounding boxes obtained from each patient, which are cut and resized to match from both the left and right sides, using pre-interpreted results as the ground truth.

Figure 12:
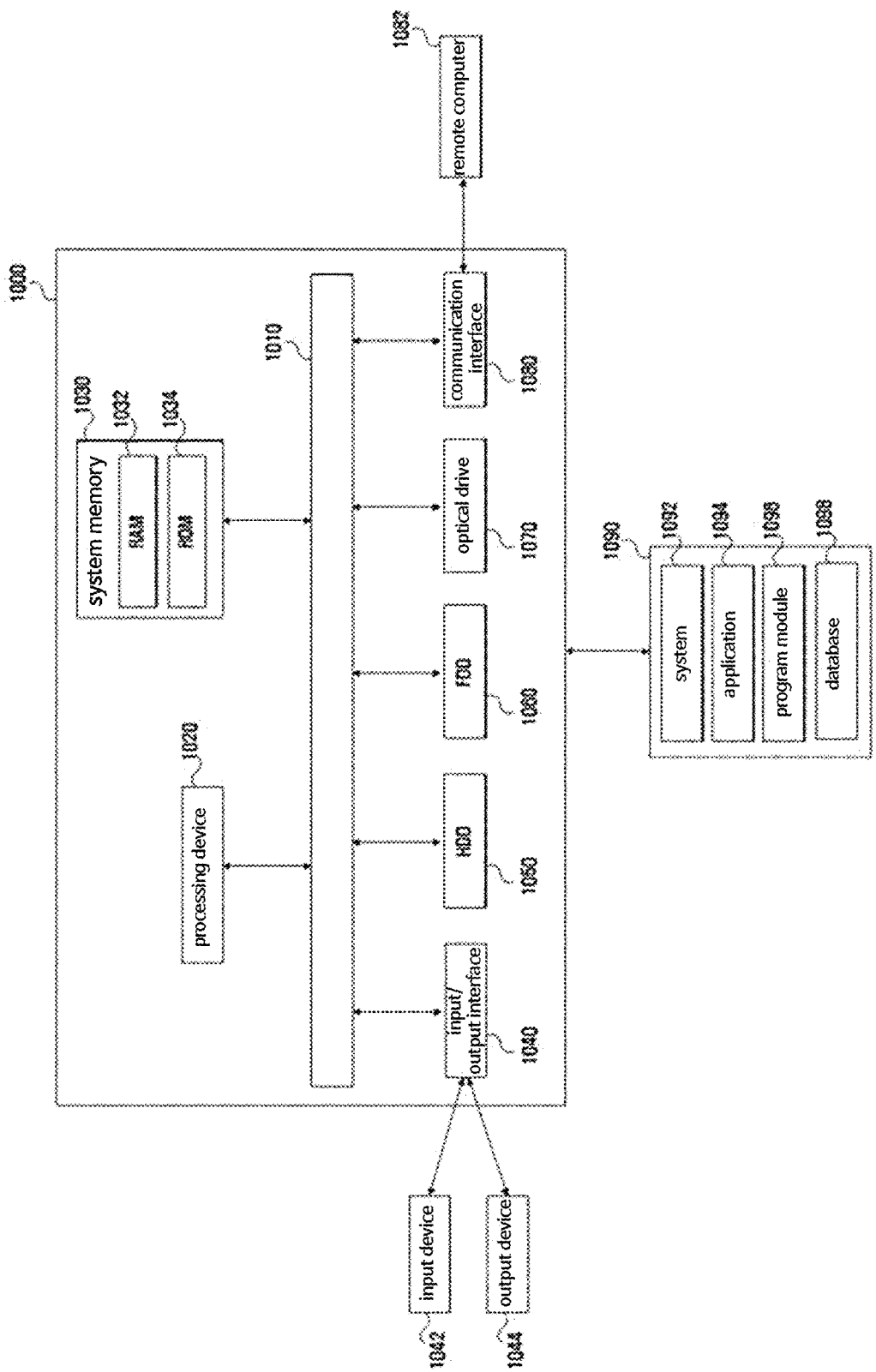
FIG. 12 is a schematic diagram of the computing environment according to an embodiment of the present disclosure.

FIG. 12 is a schematic diagram of the computing environment according to an embodiment of the present disclosure.

It is described above that the present disclosure may be generally implemented by the computing device, but those skilled in the art will well know that the present disclosure may be implemented in association with a computer executable command which may be executed on one or more computers and/or in combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The embodiments described in the present disclosure may also be implemented in a distributed computing environment in which predetermined (or selected) tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and movable and non-movable media implemented by a predetermined (or selected) method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined (or selected) other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An environment that implements various aspects of the present disclosure including a computer 1000 is shown and the computer 1000 includes a processing device 1020, a system memory 1030, and a system bus 1010. The system bus 1010 connects system components including the system memory 1030 (not limited thereto) to the processing device 1020. The processing device 1020 may be a predetermined (or selected) processor among various commercial processors. A dual processor and other multi-processor architectures may also be used as the processing device 1020.

The system bus 1010 may be any one of several types of bus structures which may be additionally interconnected to a local bus using any one of a memory bus, a peripheral device bus, and various commercial bus architectures. The system memory 1030 includes a read only memory (ROM) 1034 and a random access memory (RAM) 1032. A basic input/output system (BIOS) is stored in the non-volatile memories 1034 including the ROM, the EPROM, the EEPROM, and the like and the BIOS includes a basic routine that assists in transmitting information among components in the computer 1000 at a time such as in-starting. The RAM 1032 may also include a high-speed RAM including a static RAM for caching data, and the like.

The computer 1000 also includes an interior hard disk drive (HDD) 1050 (for example, EIDE and SATA), in which the interior hard disk drive 1050 may also be configured for an exterior purpose in an appropriate chassis (not illustrated), a magnetic floppy disk drive (FDD) 1060 (for example, for reading from or writing in a mobile diskette), and an optical disk drive 1070 (for example, for reading a CD-ROM disk or reading from or writing in other high-capacity optical media such as the DVD, and the like). The hard disk drive 1050, the magnetic disk drive 1060, and the optical disk drive 1070 may be connected to the system bus 1010 by a hard disk drive interface, a magnetic disk drive interface, and an optical drive interface, respectively. An interface for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1000, the drives and the media correspond to storing of predetermined (or selected) data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an operating environment and further, the predetermined (or selected) media may include computer executable commands for executing the methods of the present disclosure.

Multiple program modules including an operating system 1092, one or more application programs 1094, another program module 1096, and program data 1098 may be stored in the drive and the RAM 1032. All or some of the operating system, the application, the module, and/or the data may also be cached in the RAM 1032. It will be well appreciated that the present disclosure may be implemented in operating systems which are commercially usable or a combination of operating systems.

A user may input instructions and information in the computer 1000 through one or more wired/wireless input devices 1042, for example, pointing devices such as a keyboard and a mouse. Other input devices (not illustrated) may include a microphone, an IR remote controller, a joystick, a game pad, a stylus pen, a touch screen, and others. These and other input devices are often connected to the processing device 1020 through an input/output device interface 1040 connected to the system bus 1010, but may be connected by other interfaces including a parallel port, an IEEE 1394 serial port, a game port, a USB port, an IR interface, and others.

A monitor or other types of display devices are also connected to the system bus 1010 through interfaces such as a video adapter, and the like. In addition to the monitor, the computer generally includes other peripheral output devices (not illustrated) such as a speaker, a printer, others.

The computer 1000 may operate in a networked environment by using a logical connection to one or more remote computers including remote computer(s) 1082 through wired and/or wireless communication. The remote computer (s) 1082 may be a workstation, a computing device computer, a router, a personal computer, a portable computer, a micro-processor based entertainment apparatus, a peer device, or other general network nodes and generally includes multiple components or all of the components described with respect to the computer 1000. The illustrated logical connection includes a wired/wireless connection to a local area network (LAN) and/or a larger network, for example, a wide area network (WAN). The LAN and WAN networking environments are general environments in offices and companies and facilitate an enterprise-wide computer network such as Intranet, and all of them may be connected to a worldwide computer network, for example, the Internet.

When the computer 1000 is used in the LAN networking environment, the computer 1000 is connected to a local network (not shown) through a wired and/or wireless communication network interface or an adapter (not shown). The adapter (not shown) may facilitate the wired or wireless communication to the LAN (not shown) and the LAN (not shown) also includes a wireless access point installed therein in order to communicate with the wireless adapter (not shown). When the computer 1000 is used in the WAN networking environment, the computer 1000 may include a modem (not shown) or has other means that configure communication through the WAN (not shown) such as connection to a communication computing device on the WAN (not shown) or connection through the Internet. The modem (not shown) which may be an internal or external and wired or wireless device is connected to the system bus 1010 through the serial port interface (not shown). In the networked environment, the program modules described with respect to the computer 1000 or some thereof may be stored in the remote memory/storage device (not shown). It will be well known that an illustrated network connection is and other means configuring a communication link among computers may be used.

The computer 1000 performs an operation of communicating with predetermined (or selected) wireless devices or entities which are disposed and operated by the wireless communication, for example, the printer, a scanner, a desktop and/or a portable computer, a portable data assistant (PDA), a communication satellite, predetermined (or selected) equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined (or selected) technologies and techniques. For example, data, instructions, commands, information, signals, bits, symbols, and chips which may be referred in the above description may be expressed by voltages, currents, electromagnetic waves, magnetic fields or particles, optical fields or particles, or predetermined (or selected) combinations thereof.

It may be appreciated by those skilled in the art that various logical blocks, modules, processors, means, circuits, and algorithm steps described in association with the embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, an apparatus, or a standard programming and/or engineering technique. The term manufactured article includes a computer program, a carrier, or a medium which is accessible by a predetermined (or selected) computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be interpreted within the widest range which is coherent with the principles and new features presented herein.

The foregoing exemplary embodiments of the present disclosure are not implemented only by an apparatus and a method, and therefore may be realized by programs realizing functions corresponding to the configuration of the exemplary embodiment of the present disclosure or recording media on which the programs are recorded. Such recording media may be executed in a user terminal as well as a server.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method for discriminating sacroiliitis by using sacroiliac joint MR images through enhanced computer-based image processing techniques, implemented by one or more processors of a computing device, the method comprising the steps of:
   collecting MR images related to a sacroiliac joint of a patient using a medical imaging system;
   preprocessing the collected MR images;
   extracting a region of interest (ROI) corresponding to a sacroiliac joint from the preprocessed MR images by using a trained object detection model comprising a Faster Region-based Convolutional Neural Network (Faster R-CNN), wherein the model is trained to detect anatomical boundaries of the sacrum and ilium;
   resizing the extracted ROI to a predefined size;
   augmenting the ROI images labeled as positive-class training data using one or more of rotation, blurring, sharpening, contrast adjustment, or noise addition;
   generating training data by stacking at least three consecutive MR slices including the ROI;
   training a binary classification model comprising a VGG-19-based neural network using the training data; and
   using the trained model to determine the presence or absence of sacroiliitis in new MR images of a patient,
   wherein the step of preprocessing comprises a step of normalizing the collected MR images to minimize intensity variations in the MR images due to brightness variability between images of different samples or within slices of the samples,
   wherein the step of normalizing MR images comprises:
   stacking the MR images into a 3D volume;
   dividing the 3D volume into a plurality of grid regions;
   applying adaptive histogram equalization to each grid region to normalize brightness variations between slices;
   converting the processed volume into 2D slices with enhanced contrast and uniform brightness.

2. The method of claim 1, wherein the step of extracting regions of interest comprises extracting feature maps from the normalized MR images through the bounding box creation model, calculating the regions of interest of the sacroiliac joint, adjusting the size of the calculated regions of interest to be the same, and performing object classification to extract the final regions of interest (ROI) for each object.

3. The method of claim 1, wherein the step of generating training data comprises augmenting data sixfold for images labeled positive, using methods including blurring, contrast adjustment, noise addition, rotation, and sharpening, followed by extracting the area of interest, with the size of the area of interest increased by a set value up, down, left, and right, whereby changes in joint position due to image rotation can be prevented.

4. The method of claim 1, wherein the step of generating training data comprises stacking at least three consecutive slices, including the front and back slices based on a certain slice, then generating training data based on the stacked slices to consider the front and rear slices rather than learning with only one slice when determining bone marrow edema.

5. The method of claim 4, wherein the step of generating training data is carried out, for both-end slices, by stacking only one slice in front or behind the end slice.

6. A computing device for enhanced medical image processing, comprising:
   a processor comprising at least one of a central processing unit (CPU), a general purpose graphics processing unit (GPGPU), or a tensor processing unit (TPU) configured for medical image analysis; and
   a memory optimized for storing 3D medical image volumes,
   wherein the processor is configured to perform the method of claim 1.

7. A computer program, stored in a non-transitory, computer-readable storage medium and including instructions to cause a computer to perform the enhanced medical image processing comprising the method of claim 1.

* * * * *